M. McManus
Clothes Line Fastener

No. 122,476.

Patented Jan. 2, 1872.

Inventor.
M. McManus
Chipman Hosmer & Co
Attys.

Witnesses
F. B. Curtis
J. M. Hyne

UNITED STATES PATENT OFFICE.

MICHAEL McMANUS, OF EAST SAGINAW, MICHIGAN.

IMPROVEMENT IN CLOTHES-LINE FASTENERS.

Specification forming part of Letters Patent No. 122,476, dated January 2, 1872; antedated December 20, 1871.

*To all whom it may concern:*

Be it known that I, MICHAEL McMANUS, of East Saginaw, in the county of Saginaw and State of Michigan, have invented a new and valuable Improvement in Clothes-Line Fasteners; and I do hereby declare that the following is a full, clear, and exact description of the construction and operation of the same, reference being had to the annexed drawing making a part of this specification, and to the letters and figures of reference marked thereon.

Figure 1:
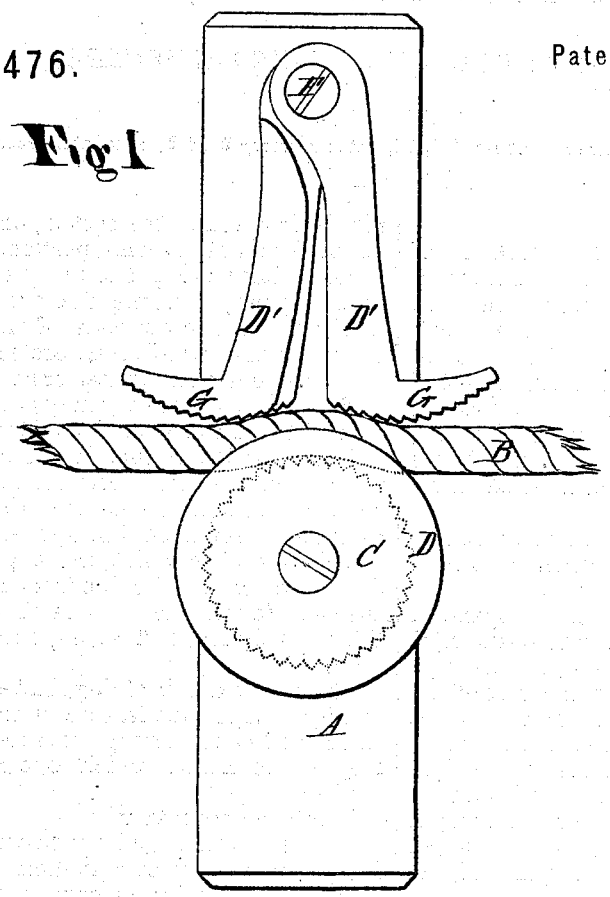
Figure 2:
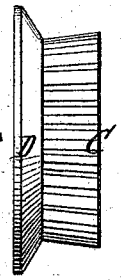

Figure 1 of the drawing is a representation of a front elevation of my invention. Fig. 2 is a side view of toothed pulley.

This invention has relation to an improved device for securing clothes-line to posts without tying or looping, and in such a manner that the weight of the clothes on either side of the post may not loosen the line and drop the clothes on the ground. It consists in the construction and novel arrangement of a toothed pulley on the periphery of which the line rests, and two serrated dogs hung together on a pin above the line, so as to hold the same between their serrated lugs and the pulley, all as hereinafter described.

In the accompanying drawing illustrating this invention, A represents a post, to which the line is to be secured; B, the clothes-line; C, a toothed pulley-wheel journaled to the post A, and formed with a flange, D, to hold the line in place. The toothed periphery of said pulley has a slight incline toward the flange D, which is also beveled on its inner face—the object being to provide a better place for the line to rest in. A grooved wheel is obviously an equivalent. D' designates a pair of dogs having eyes at their upper ends, by means of which they are hung together on a pin, F, inserted in the post A, one resting upon the other at that point, portions of their contiguous faces being cut away or flanged so that they may come together evenly, as shown in Fig. 1. The lower ends of these dogs are formed with curved lugs G, projecting in opposite directions, and serrated or notched on their under sides so that they may grasp the upper side of the line firmly and hold it from moving.

The operation of this device is as follows: The end of the line is first secured in place to some convenient object, and the line drawn over the pulley until it is tight enough to hold the clothes, after which the dogs are pressed down, preventing the line from moving when the same is weighted. It is then brought to the next pulley, and so on, according as required.

The use of a pair of dogs instead of a single one is an important feature of this invention, since the line is thereby prevented from drawing out, no matter which side is filled with clothes.

I claim as my invention—

1. The double dogs D' with curved serrated lugs or ends G, in combination with the beveled toothed pulley C, constructed with the flange D, when all parts are arranged and applied as and for the purpose specified.

2. The pulley C having a beveled toothed periphery and beveled flange D, in combination with a dog or dogs, D', as and for the purpose set forth.

In testimony that I claim the above I have hereunto subscribed my name in the presence of two witnesses.

MICHAEL McMANUS.

Witnesses:
A. R. HOUEY,
P. O'KEEF.

(91)